United States Patent [19]
Wyslotsky

[11] Patent Number: 5,429,833
[45] Date of Patent: Jul. 4, 1995

[54] RECLOSEABLE MODIFIED ATMOSPHERE CLAMSHELL PACKAGE

[75] Inventor: Ihor Wyslotsky, Rolling Meadows, Ill.

[73] Assignee: Redex Packaging Corporation, Schaumburg, Ill.

[21] Appl. No.: 86,716

[22] Filed: Jul. 2, 1993

Related U.S. Application Data

[63] Continuation-in-part of Ser. No. 87,602, Jul. 2, 1993.

[51] Int. Cl.⁶ .................... A21D 10/02; B65D 81/24; B65D 17/40
[52] U.S. Cl. .................... 426/122; 206/213.1; 220/276; 220/306; 220/354; 426/106; 426/128
[58] Field of Search ............... 220/352, 354, 356, 306, 220/307, 359, 266, 276; 206/213.1; 426/122, 316, 128, 106

[56] References Cited

U.S. PATENT DOCUMENTS

| | | | |
|---|---|---|---|
| 2,915,214 | 12/1959 | Frankel | 220/266 |
| 2,998,158 | 8/1961 | Tupper | 220/276 |
| 3,101,864 | 8/1963 | Glickman | 220/306 |
| 3,108,708 | 10/1963 | Betner | 220/269 |
| 3,326,408 | 6/1967 | Ringlen | 220/307 |
| 3,388,827 | 6/1968 | Thanhauser et al. | 220/307 |
| 4,193,496 | 3/1980 | Barratt | 220/306 X |
| 4,202,464 | 5/1980 | Mohs et al. | 220/339 |
| 4,844,263 | 7/1989 | Hadtke | 220/359 X |
| 4,865,217 | 9/1989 | Yoshimoto | 220/359 |
| 4,919,955 | 4/1990 | Mitchell | 206/213.1 X |

*Primary Examiner*—Bryon P. Gehman
*Attorney, Agent, or Firm*—Hill, Steadman & Simpson

[57] ABSTRACT

The recloseable clamshell package of the invention includes a container portion and a lid portion. The lid portion has a lip portion which is congruently shaped with the container lip portion for mating engagement therewith in order to form a closed package. The lid portion includes corner portions which are congruently shaped with the container portions for mating engagement therewith.

6 Claims, 1 Drawing Sheet

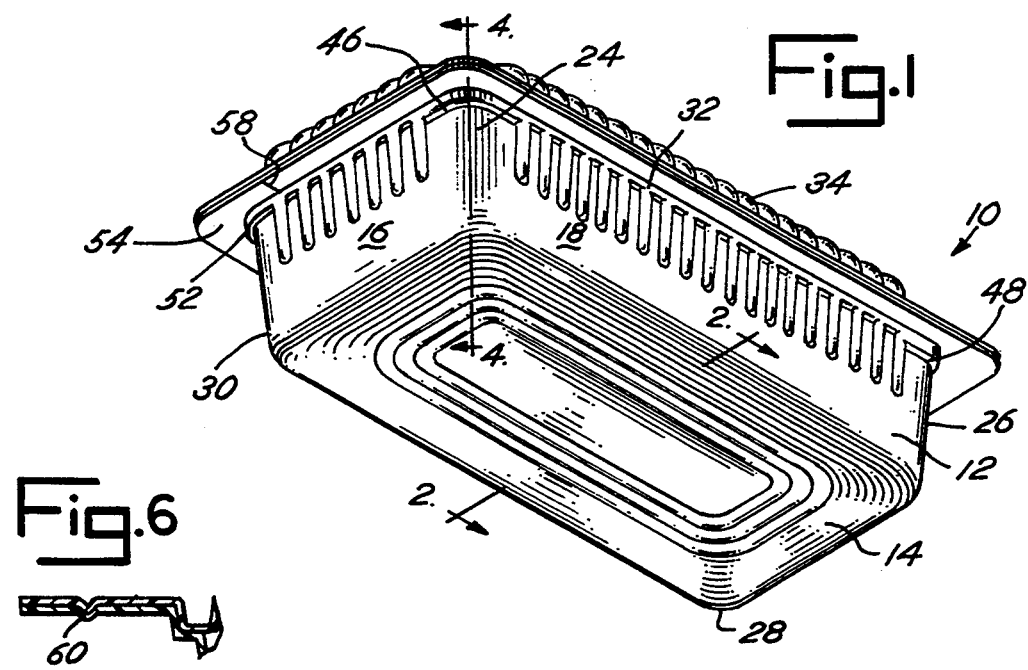
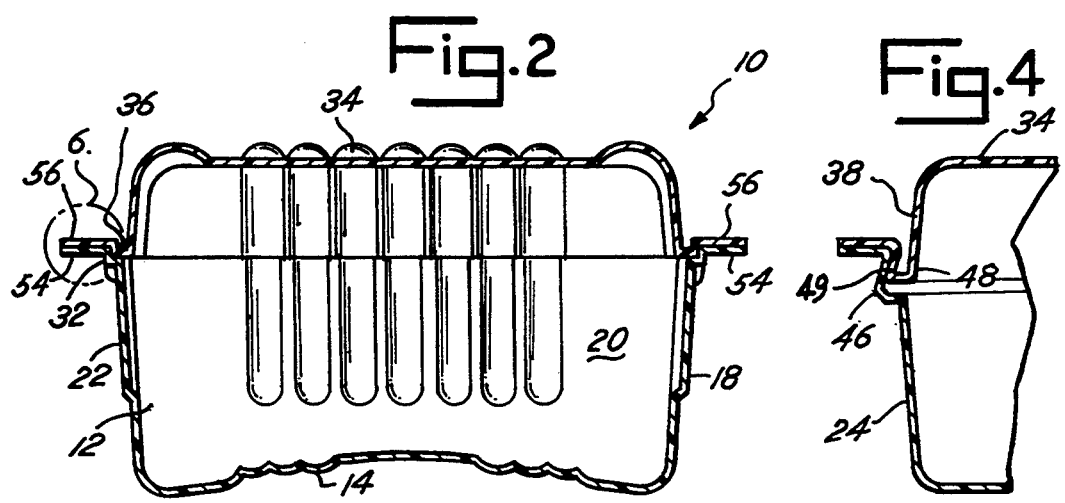
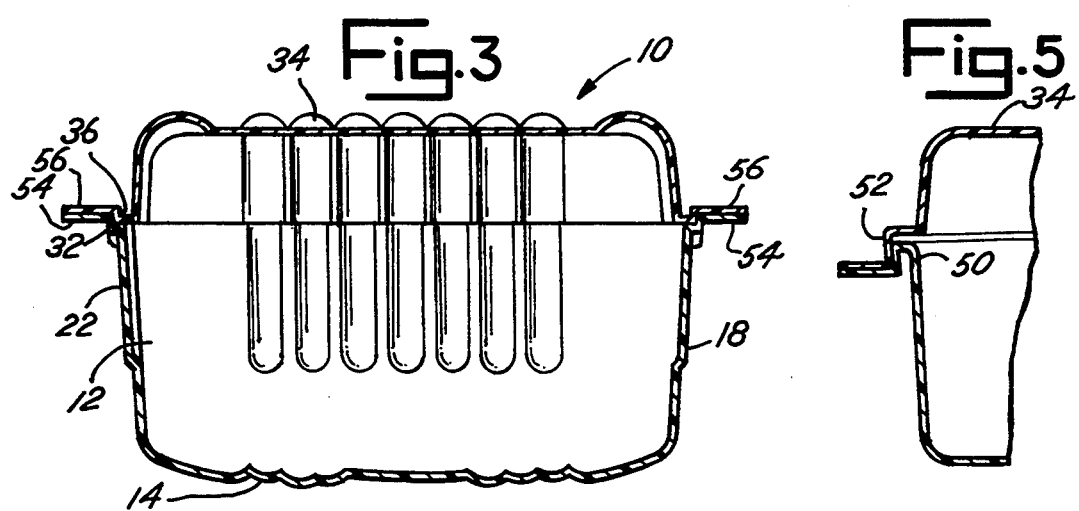

RECLOSEABLE MODIFIED ATMOSPHERE CLAMSHELL PACKAGE

The present invention is a continuation-in-part of the application entitled: "Method Of Extending Shelf Life Or A Comestible Product while Providing A Locally Packaged Appearance", Ser. No. 08/087,602, filed on Jul. 2, 1993, still pending, the, disclosure of which is incorporated by reference herein, herewith, and related generally to packaging primarily for comestible products, and more particularly to a recloseable clamshell package having novel corner locking features engageable between the container portion and the lid portion thereof and suitable for providing a recloseable package, which package may be a modified atmosphere package having strippable opening means.

BACKGROUND OF THE INVENTION

In the prior art, consumers have found that recloseable packages are desirable, particularly for comestible products, and in some embodiments especially in regard to bakery products, such as muffins, croissants and other freshly baked bakery goods, such as may be typically provided in a large grocery supermarket which has a bakery on the premise. Packaging provided for such bakery goods has often been in the form of clear plastic clamshell packaging. Such clear plastic clamshell packaging, and especially for such bakery goods, provides a baked-on-the-premises image which grocery retailers have found to be especially appealing to consumers.

It has also been deemed desirable in regard to such clear plastic clamshell packaging to develop recloseability features which are reliable and easy to operate, and especially in circumstances where more than one serving of a comestible product is contained therewithin, in order to reduce drying out or other deterioration of the comestible food product contained therewithin.

Accordingly, and in view of certain deficiencies of the prior art teachings, it is a material object of the improved recloseable clamshell package of the present invention to provide easy to operate means for reclosing a clamshell-type package.

It is a yet further object of the improved clamshell package of the present invention to provide a recloseability mechanism having mutually engageable corner disposed detent or distention mechanisms for positive manual engagement upon opening and reclosing of the package, and also used for automatic insertion of the lid onto the base by means of machine application.

It is a yet further object of the recloseable clamshell package of the present invention to provide such recloseability features in conjunction with a clamshell package which has easy operable and strippable opening means for opening such a package, which may be a modified atmosphere package.

SUMMARY OF THE INVENTION

The present invention is directed to a modified atmosphere clamshell package, having lockable halves, and further incorporating in preferred embodiments an easy to open strip. Such modified atmosphere clamshell package includes a hermetic enclosure mechanism, and further includes bottom disposed bellows-like structures to maintain equal inner and outer pressures to utilize partial pressure differential means for reducing stresses on the package seal.

The recloseable clamshell package of the invention includes a container portion and a lid portion. The lid portion has a lip portion which is congruently shaped with the container lip portion for mating engagement therewith in order to form a closed package. The lid portion includes corner portions which are congruently shaped with at least a portion of the container portions for mating engagement therewith.

The present invention is more particularly directed to congruently shaped lid locking and matingly engageable container and lid distentions disposed on each of the container lip and container lid lip elements and respective at each of the container portions and lid corner portions. The congruently shaped container and lid distentions have slightly different dimensions to exert an engagement force therebetween when engaged. Such congruently shaped and lid locking and matingly engageable container and lid distentions are in one preferred embodiment substantially arcuate in shape (as determined in the plain of cross-section which is parallel with the plane with the respective lip portion).

BRIEF DESCRIPTION OF THE DRAWING

In the accompanying drawing, wherein common numerals are utilized with common elements, the presently inventive recloseable clamshell package of the present invention is depicted, and wherein:

FIG. 1 is a perspective view from a slightly bottom perspective of a recloseable clamshell package, which may be a modified atmosphere package, having a package container portion and a package lid portion, each of which includes in the embodiment of FIG. 1 a sealing flange thereon for overlapping and sealing disposition therebetween, and illustrating at the upper corner of the container portion the substantially arcuate shaped distention for locking with a congruently shaped distention of the lid portion of the container;

FIG. 2 is a slightly enlarged cross-sectional view taken along line 2—2 of FIG. 1 and showing the sidewalls of the container including a reinforced portion of the sidewall of the lid portion of the package and the package bottom and depicting a package bottom panel in retracted disposition, which is an additional feature of the package of the present invention as set forth in an accompanying patent application;

FIG. 3 is a slightly enlarged side view corresponding to that in FIG. 2 and showing the retractable bottom panel feature in nonretracted configuration, which is a feature of the recloseable clamshell package as set forth and claimed in a separate patent application; and FIG. 4 is a greatly enlarged cross-sectional view taken along lines 4—4 of FIG. 1 and showing a transverse cross-sectional view of the corner of the recloseable clamshell package including showing the engagement between the container portion and the lid portion at such corner to illustrate the respective congruently shaped lid locking and matingly engageable container and lid distentions.

FIG. 5 is a cross-sectional view showing an alternative embodiment similar to that of FIG. 4, and in particular showing a transverse cross-sectional view of the corner of such alternative embodiment of a recloseable clamshell package, wherein the congruently shaped lid locking and matingly engageable container and lid distentions have the lid distention fittingly disposed over the container distention; and FIG. 6 is a cross-sectional view of the container flange and the lid flange wherein an indentation is disposed therein for ease of peel comprising a line of reduced strength, which may be formed, such as for example by a heat sealing bar to assist in stripping and removing a portion of the lid flange.

The improved recloseable clamshell package of the present invention may be better understood with regard to the following detailed description of preferred embodiments.

DETAILED DESCRIPTION OF PREFERRED EMBODIMENTS

Referring now to the drawing, and wherein a recloseable clamshell package generally 10 is set forth, the various elements thereof are depicted.

In particular, the recloseable clamshell package of the present invention includes a container portion 12. The container portion 12 includes a bottom element 14 and connected sidewalls 16,18,20,22 which are connected to bottom 14 and project upwardly therefrom. The sidewalls 16,18,20,22 are connected together at their respective lateral edges to form container corners 24,26,28,30. Together, the sidewalls 16,18,20,22 form a container lip portion 32 which is disposed at the upper extremities of the connected sidewalls 16,18,20,22 and unitarily extends along the top portion of each such sidewalls 16,18,20,22 and each container corner 24,26,28,30.

The clamshell package 10 of the present invention further includes a lid portion 34 which has a lid lip portion 36 substantially congruently shaped with at least a portion of the container lip portion 32 for mating engagement therewith. Together the lid lip portion 36 and container lip portion 32 form a closable and recloseable package. The lid portion 34 includes lid corner portions 38,40,42,44 which are congruently shaped with the container corners 24,26,28,30 for mating engagement therewith.

The recloseable clamshell package 10 of the present invention particularly includes respective congruently shaped lid locking and matingly engageable container and lid distentions respectively 46,48 which are disposed respectively on the container lip 32 and the lid lip 36 respectively at each of the container corner portions 24,26,28,30 and the lid corner portions 38,40,42,44. The congruently shaped container and lid distentions 46,48 have slightly different dimensions to assert an engagement force therebetween when engaged. The congruently shaped lid locking and matingly engageable container lid lip distentions 46,48 are substantially arcuate shaped in a preferred embodiment, as set forth in FIG. 4 hereof, as shown in the plane of cross-section which is parallel with the plane of the respective lip portion 32,36.

The container distention 46 may be either a female distention, as shown in FIG. 4 or a male distention 50 as shown in FIG. 5. The lip distention may be either the male lip distention 48 as shown in FIG. 4 or a female distention 52 as shown in FIG. 5.

In preferred embodiments at least one of the container and lip distentions 46,48 or 50,52 includes a positive force threshold deformable means for a stretchingly but recoverably deforming thereof during mating engagement to permit engagement of the container and lip distentions 46,48 or 50,52. As shown in FIG. 4, lid lip distention 48 includes a rim 49 which has a dimension extending outwardly from lid portion 34 which is greater than the corresponding portion of container distension 46 to snap the cover in place, and thereby to form a positive, recloseable engagement. An alternative embodiment is set forth in FIG. 5, wherein the lid lip distention and container lip distentions are essentially reversed, with the lid lip distention disposed exterior to the container lip distention. The improved recloseable clamshell container portion 12 of the present invention may preferably include a laterally extending container flange 54. Such laterally extending container flange 54 extends preferably laterally of container lip 32. In such preferred embodiments, the container flange 54 extends circumferentially of substantially the entirety of the container lip portion 32 as shown in FIG. 1.

The lid portion 34 may further preferably include a lid flange 56 which extends laterally from the lid lip portion 36 thereof for overlapping disposition with the container flange 54. The container flange 54 and the lid flange 56 are sealed together in preferred embodiments. A peel opening means 58 as shown in FIG. 1 includes a line of reduced strength 60 as shown in FIG. 6 wherein indentation may be made, such as by heat sealing bar upon container flange 54 and lid flange 56, such that a peal force may be directed along an opening strip for removal of at least a substantial portion of either the container flange 54, or in more preferred embodiments, the lid flange 56.

The basic and novel characteristics of the improved methods and apparatus of the present invention will be readily understood from the foregoing disclosure by those skilled in the art. It will become readily apparent that various changes and modifications may be made in the form, construction and arrangement of the improved apparatus of the present invention, and in the steps of the inventive methods hereof, which various respective inventions are as set forth hereinabove without departing from the spirit and scope of such inventions. Accordingly, the preferred and alternative embodiments of the present invention set forth hereinabove are not intended to limit such spirit and scope in any way.

What is claimed is:

1. A recloseable hermetically sealed, modified atmosphere package comprising:
    a substantially rigid container portion including bottom with container sidewalls connected thereto and projecting upwardly therefrom; and
    a separately formed substantially rigid lid portion;
    said container sidewalls connected together at their respective lateral edges to form container corners;
    said connected sidewalls together forming a container lip portion disposed at the upper extremity of the connected sidewalls unitarily extending along the top portion of each sidewall and each container corner;
    said lid portion including a centrally dome portion bordered by a lid lip portion and upwardly extending therefrom, and said lid lip portion substantially congruently shaped with at least a portion of said container lip portion for mating engagement therewith to form a hermetically sealed, modified atmosphere package;
    substantially congruently-shaped lid locking and matingly engageable respective container and lid distentions, disposed on each said container lip portion and said lid lip portion; and container and lid flanges extending circumferentially around substantially the entirety of said container lip and said lid lip for overlapping disposition with each other;

said container flange and said lid flange being sealed together;

said lid flange having peel opening means including a line of reduced strength disposed upon said lid flange for directing a peel force therealong for removal of at least a substantial portion of said lid flange for opening said package;

said container portion and said lid portion joined by a hermetic seal to enclose an hermetically sealed volume therewithin; and a food product and a substantially inert gas contained within said hermetically sealed volume to form a modified atmosphere package for containing said food product, said inert gas surrounding said food product until said peel opening means is used to open said package.

2. The package of claim 1 wherein said container distention is selected from the group consisting of male and female distentions.

3. The package of claim 2 wherein said lip distention is selected from the group consisting of female and male distentions to matingly engage with said container distention.

4. The package of claim 1 wherein said container flange and said lid flange include respective seal indentations which are bonded together, and which form a line of reduced strength thereon for directing a peel force therealong.

5. The package of claim 1 wherein said substantially congruently-shaped lid locking and matingly engageable respective container and lid distentions are disposed respectively at each of said container corner portions and at each of said lid corner portions.

6. The package of claim 1 wherein said package lid and container are made of a barrier material against movement of gases to or from said package.

* * * * *